(12) United States Patent
Lee et al.

(10) Patent No.: US 8,538,463 B2
(45) Date of Patent: Sep. 17, 2013

(54) APPARATUS AND METHOD FOR PROVIDING COMMUNICATION QUALITY INFORMATION

(75) Inventors: Meong-Hun Lee, Daejeon (KR); Yoon Ju Lee, Daejeon (KR); DongSeung Kwon, Daejeon (KR); Kwang Jae Lim, Daejeon (KR); Sung Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/245,963

(22) Filed: Sep. 27, 2011

(65) Prior Publication Data

US 2012/0135748 A1 May 31, 2012

(30) Foreign Application Priority Data

Nov. 26, 2010 (KR) .................... 10-2010-0119133

(51) Int. Cl.
*H04W 24/00* (2009.01)

(52) U.S. Cl.
USPC ............... 455/457; 455/404.2; 455/456.3; 455/456.6; 455/456.1; 455/420

(58) Field of Classification Search
USPC ............... 455/456.1–457, 404.2, 414.1, 420, 455/421, 422.1; 715/851, 853, 764, 810
See application file for complete search history.

(56) References Cited

U.S. PATENT DOCUMENTS

| | | | |
|---|---|---|---|
| 7,380,268 B2 | 5/2008 | Challener et al. | |
| 2006/0183487 A1* | 8/2006 | Allen et al. | 455/456.5 |
| 2010/0097494 A1* | 4/2010 | Gum et al. | 348/231.5 |
| 2010/0250109 A1* | 9/2010 | Johnston et al. | 701/200 |

FOREIGN PATENT DOCUMENTS

| | | |
|---|---|---|
| JP | 2008-153858 | 7/2008 |
| KR | 10-0270704 | 8/2000 |
| KR | 10-2004-0096616 | 11/2004 |
| KR | 10-2005-0019348 | 3/2005 |
| KR | 10-0727749 | 6/2007 |
| KR | 10-2008-0028698 | 4/2008 |
| KR | 10-0833514 | 5/2008 |
| KR | 10-2010-0075274 | 7/2010 |

\* cited by examiner

*Primary Examiner* — Vladimir Magloire
*Assistant Examiner* — Babar Sarwar
(74) *Attorney, Agent, or Firm* — Staas & Halsey LLP

(57) ABSTRACT

A communication quality visualization information providing system acquires a communication quality, generates communication quality visualization information by mapping the acquired communication quality information to geographic information, and provides corresponding communication quality visualization information according to a user request.

20 Claims, 9 Drawing Sheets

APPARATUS AND METHOD FOR PROVIDING COMMUNICATION QUALITY INFORMATION

CROSS-REFERENCE TO RELATED APPLICATION

This application claims priority to and the benefit of Korean Patent Application No. 10-2010-0119133 filed in the Korean Intellectual Property Office on Nov. 26, 2010, the entire contents of which are incorporated herein by reference.

BACKGROUND OF THE INVENTION (a) Field of the Invention

The present invention relates to an apparatus and method for providing communication quality information.

(b) Description of the Related Art

An Internet map service is a map service that can use in a Web browser that is installed in a portable terminal device such as a personal computer or a laptop computer and a mobile phone. The Internet map service provides local company information as well as a company position, a phone number, and a driving path according to a position.

A typical Google map service provides free of charge distance and area information that collects from all over the world through almost real-time update through a Google Website and provides an actual space view at various locations by connecting with an 'aviation view' function. However, a Google map service or other geographic information systems (GIS)-based map service does not provide communication quality related information such as solution of a weak communication area and distribution of a communication amount load of a network, and selection of a connection network according to a service.

In general, a wireless communication service is mainly provided by an Internet service provider (ISP), and in a home or a small scale of corporation, an Internet service is used using an Internet wired/wireless sharing router due to increase in use of wireless Internet. A wireless local area network (LAN) has algorithm that searches for and serves a channel having a smallest use amount within a band, a speed of a wireless Internet service is deteriorated due to frequency interference and a distance difference from an access point (AP).

In methods of providing a wireless Internet service, a wireless communication connection program that is provided by an ISP provides channel information and signal intensity information of all equipments existing within a wireless LAN reception range as well as a wireless LAN equipment that is directly provided by the ISP. However, the wireless communication connection program notifies only an equipment existing within a range of a location at which a user is positioned and does not provides information that guarantees mobility and information about other communication methods.

Further, a zone notification service such as a 'Wi-Fi Zone', which is a Web scheme in which an ISP provides displays a wireless communication service area that is installed by the ISP in a map or a list, whereby a service area is displayed but is not provided in real-time and only an equipment in which the ISP provides is displayed in a map or a list.

Further, a connection program that is provided by a network interface card (NIC) provider provides channel information and signal intensity information of all equipments existing within a wireless LAN reception range, but notifies only an equipment existing within a range of a location at which a user is presently positioned and does not provide information that guarantees mobility and compatibility about other communication methods.

That is, because the user cannot determine information about areas other than a location at which the user is presently positioned or communication quality related information about other communication methods, it is difficult for the user to receive a service in an optimum communication quality state.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method for providing communication quality information having advantages of providing an optimum communication service to a user.

An exemplary embodiment of the present invention provides a communication quality information providing apparatus. The communication quality information providing apparatus includes at least one communication module, a position detection unit, an image photographing unit, and a visualization device. The at least one communication module receives a collection instruction from a user and acquires communication quality information corresponding to each communication method while moving. The position detection unit acquires position information of the apparatus according to the collection instruction. The image photographing unit acquires image information by photographing an image according to the collection instruction and generates image geographic information by mapping the image information to corresponding geographic information. The visualization device generates communication quality visualization information by synchronizing the communication quality information with at least one of the position information and the image geographic information.

Another embodiment of the present invention provides a method of providing communication quality information of a communication quality information providing apparatus. The method includes receiving a collection instruction from a user; acquiring communication quality information to correspond to the collection instruction; acquiring position information of the communication quality information providing apparatus to correspond to the collection instruction; and providing communication quality visualization information by mapping the communication quality information and the position information to geographic information.

Yet another embodiment of the present invention provides a method of providing communication quality information of a communication quality information providing apparatus. The method includes receiving an information request including at least area information from a user; and providing communication quality visualization information corresponding to the information request, wherein the communication quality visualization information is generated by mapping the communication quality information to geographic information.

According to an exemplary embodiment of the present invention, by measuring a communication quality of various communication methods, synchronizing a communication quality of a measurement area with geographic information in real-time, and visualizing and providing the communication quality, a guideline that can satisfy a service quality is provided in a service area that provides a plurality of communication methods to a user and thus a solution of a weak communication area problem can be provided.

Further, by constructing a public use communication network, a cost can be reduced and deterioration of a service quality due to frequency interference can be minimized.

DETAILED DESCRIPTION OF THE EMBODIMENTS

Figure 1:
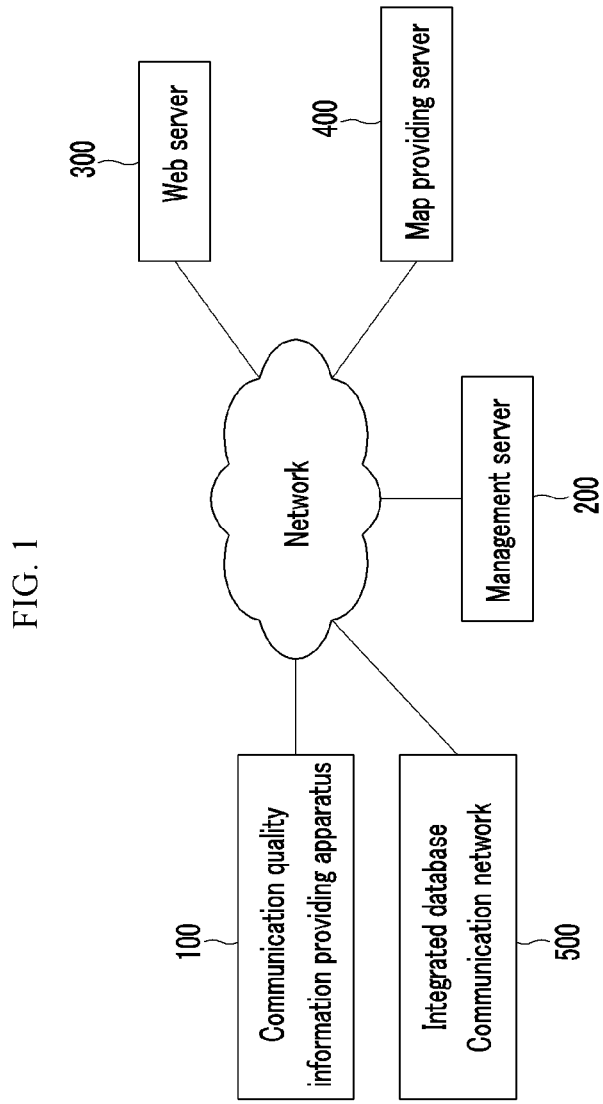
FIG. 1 is a diagram illustrating a communication quality visualization information providing system according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising", will be understood to imply the inclusion of stated elements but not the exclusion of any other elements.

Hereinafter, an apparatus and method for providing communication quality information according to an exemplary embodiment of the present invention will be described in detail with reference to the drawings.

FIG. 1 is a diagram illustrating a communication quality visualization information providing system according to a first exemplary embodiment of the present invention.

Referring to FIG. 1, the communication quality visualization information providing system includes a communication quality information providing apparatus 100, a management server 200, a Web server 300, a map providing server 400, and an integrated database 500, and the communication quality information providing apparatus 100, the management server 200, the Web server 300, the map providing server 400, and the integrated database 500 are connected through a communication network.

The communication quality information providing apparatus 100 includes communication modules (not shown) of at least one communication method, and the communication modules perform communication with the respective communication methods. The respective communication module transmits/receives a communication signal of a corresponding communication method and measures communication quality information such as communication signal intensity, a data processing ratio, and an error rate. The communication method includes a method of using a local area network, a method of using a metropolitan area network, a method of using a wide area network, a method of using satellite communication, code division multiple access (CDMA), long term evolution (LTE), worldwide interoperability for microwave access (WiMAX), and mobile WiMAX and may include other communication methods that can transmit a sound, an image, and data.

The communication quality information providing apparatus 100 generates communication quality visualization information by mapping communication quality information that is measured by a communication module to geography information, and transfers the communication quality visualization information to the management server 200. The communication quality information providing apparatus 100 measures communication quality information while moving and generates communication quality visualization information by mapping the communication quality information to geographic information in real-time. Communication quality visualization is to represent a weak communication area, communication coverage, and channel information through a picture, a color, or a character. For example, communication quality visualization is to represent with different colors a network on a layer basis in a picture or an image, with a black color a weak communication area, with a blue color an overlapping portion of communication, and with a character a data numerical value of each communication method when clicking a building on Web. The communication quality information providing apparatus 100 receives a providing request for communication quality visualization information from a user and provides the communication quality visualization information. In this case, when communication quality visualization information that is requested by the user does not exist in an inner database, the communication quality information providing apparatus 100 can newly provide corresponding communication quality visualization information by connecting to the management server 200. Further, the communication quality information providing apparatus 100 may provide communication quality visualization information with only map information or may provide communication quality visualization information through Web by interlocking with the Web server 300 and the map providing server 400 by a user request.

That is, the communication quality information providing apparatus 100 can perform a function of collecting communication quality visualization information and a function of providing communication quality visualization information by a user request. The management server 200 receives communication quality visualization information from the communication quality information providing apparatus 100, stores and manages the communication quality visualization information in the integrated database 500, and provides the communication quality visualization information by a request from the communication quality information providing apparatus 100.

The management server 200 may distribute and manage communication quality visualization information to hierarchically connected sub-management servers (not shown) of each area.

The Web server 300 receives communication quality visualization information that is stored in the integrated database 500 from the management server 200, discloses the communication quality visualization information to Web, and provides the communication quality visualization information through Web by a request of the communication quality information providing apparatus 100.

The map providing server 400 receives communication quality visualization information that is stored in the integrated database 500 from the management server 200, displays the communication quality visualization information in a map or geographic information, and provides the communication quality visualization information through the map by a request of the communication quality information providing apparatus 100.

The integrated database 500 stores communication quality visualization information that is transferred from at least one communication quality information providing apparatus 100.

Figure 2:
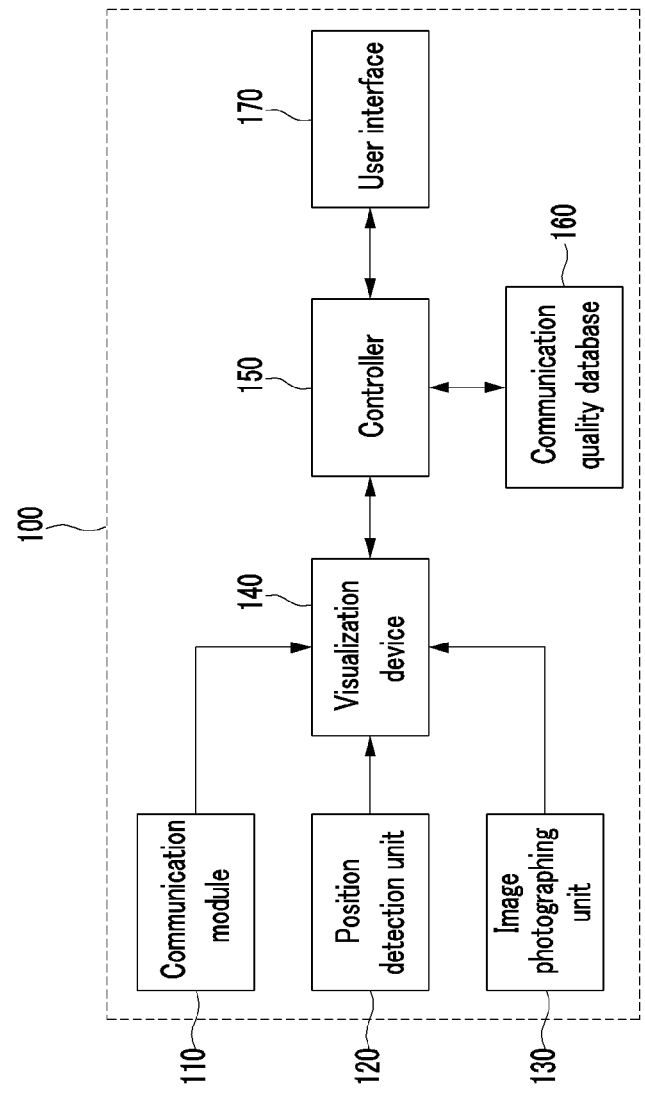
FIG. 2 is a block diagram illustrating a configuration of a communication quality information providing apparatus of FIG. 1.

FIG. 2 is a block diagram illustrating a configuration of a communication quality information providing apparatus of FIG. 1.

Referring to FIG. 2, the communication quality information providing apparatus 100 includes at least one communication module 110, a position detection unit 120, an image photographing unit 130, a visualization device 140, a controller 150, a communication quality database 160, and a user interface 170.

The at least one communication module 110 performs communication with the respective communication method, acquires communication quality information by transmitting/receiving a communication signal of the respective communication method, and transfers the acquired communication quality information to the visualization device 140 and the communication quality database 160.

The position detection unit 120 acquires position information of the communication quality information providing apparatus 100 by a satellite signal from an artificial satellite, and when the position detection unit 120 cannot receive a satellite signal from an artificial satellite, the position detection unit 120 acquires position information of the communication quality information providing apparatus 100 using orientation and position sensors (not shown). The position detection unit 120 transfers the position information of the communication quality information providing apparatus 100 to the visualization device 140 and the communication quality database 160.

The image photographing unit 130 photographs image information, generates image geographic information by synthesizing image information that is photographed by movement of the communication quality information providing apparatus 100 with corresponding geographic information, and transfers the image geographic information to the visualization device 140 and the communication quality database 160. In this case, the image information may include picture information that can represent geographic information.

The image photographing unit 130 may store geographic information or may request and receive geographic information from the map providing server 400. In this case, the geographic information may include at least one geographic information with visualization information such as two-dimensional, and three-dimensional visual information.

The visualization device 140 synchronizes information that receives from the communication module 110, the position detection unit 120, and the image photographing unit 130, generates communication quality visualization information by synchronizing image geographic information of the image photographing unit 130, position information that is detected by the position detection unit 120, and communication quality information that is measured by the communication module 110, and stores the communication quality visualization information in the communication quality database 160.

The controller 150 controls the communication module 110, the position detection unit 120, the image photographing unit 130, the visualization device 140, and the communication quality database 160 and transfers communication quality visualization information that is stored in the communication quality database 160 to the management server 200 by a request of the management server 200 or periodically.

The controller 150 may provide communication quality visualization information to a user by searching for the communication quality database 160 according to a user request that is received through the user interface 170, and when communication quality visualization information corresponding to a user request does not exist in the communication quality database 160, the controller 150 may receive communication quality visualization information from the integrated database 500 through the management server 200 and provide the communication quality visualization information to the user.

Further, when a problem occurs in at least one of the communication module 110, the position detection unit 120, the image photographing unit 130, the visualization device 140, the communication quality database 160, and the user interface 170, the controller 150 notifies a user of the problem through the user interface 170.

The communication quality database 160 stores communication quality information that receives from the communication module 110, position information that receives from the position detection unit 120, and image geographic information that receives from the image photographing unit 130. Further, the communication quality database 160 stores communication quality visualization information that receives from the visualization device 140. Such information that is stored in the communication quality database 160 can be used for a channel interference problem and communication transmission/reception information on a distance basis, communication load information, definite notation of a weak communication area, a communication method in which a user can connect, continuous providing of communication, an optimum network option through communication load measurement, communication network security, etc.

The user interface 170 connects a user and the communication quality information providing apparatus 100, the user can request communication quality visualization information to the communication quality information providing apparatus 100 through the user interface 170, and the communication quality information providing apparatus 100 can provide communication quality visualization information that is requested by the user through the user interface 170. For example, the user interface 170 receives information such as an area that is selected by the user and a communication method, generates a visualization information request instruction, transfers the visualization information request instruction to the communication module 110, the position detection unit 120, the image photographing unit 130, the visualization device 140, and the controller 150, and stores the visualization information request instruction in the communication quality database 160.

Figure 3:
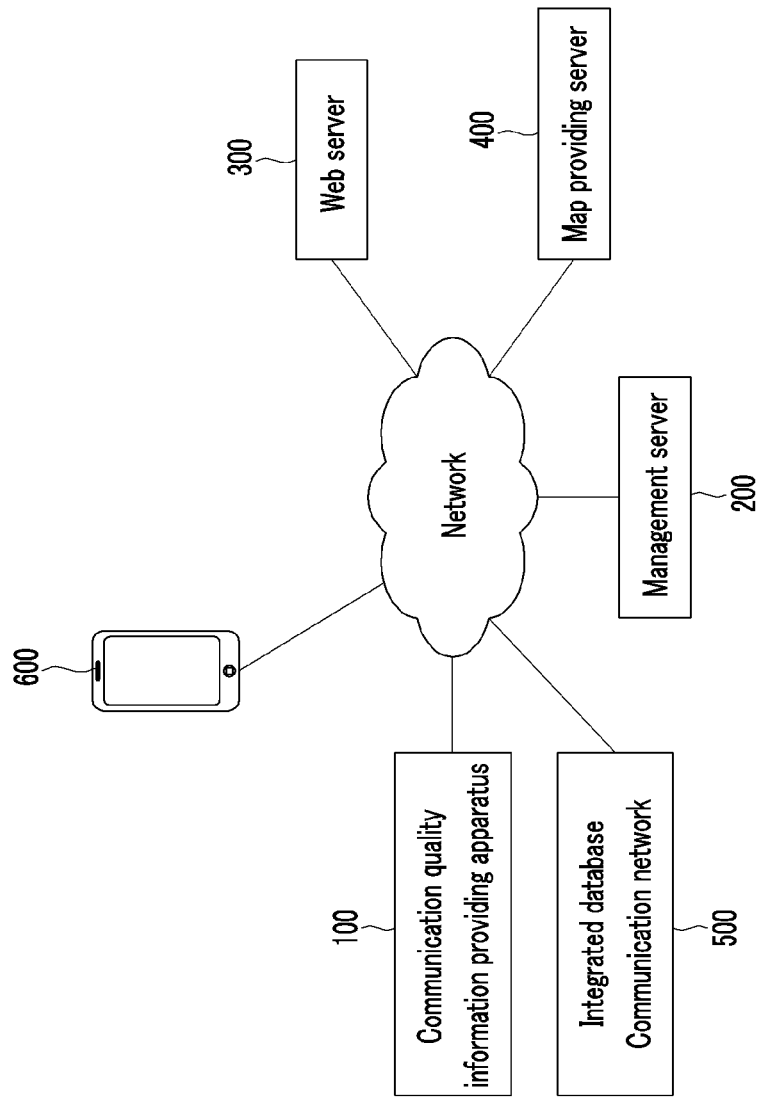
FIG. 3 is a diagram illustrating a communication quality visualization information providing system according to a second exemplary embodiment of the present invention.
Figure 4:
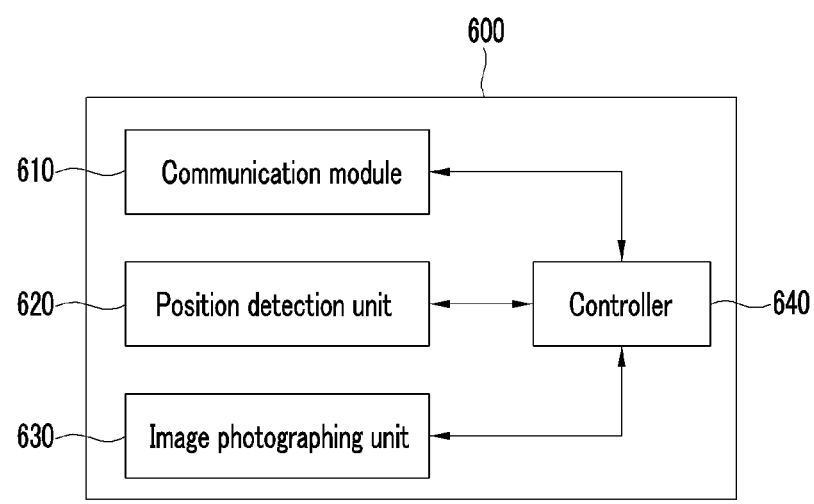
FIG. 4 is a block diagram illustrating a configuration of an individual communication apparatus that is shown in FIG. 3.

FIG. 3 is a diagram illustrating a communication quality visualization information providing system according to a second exemplary embodiment of the present invention, and FIG. 4 is a block diagram illustrating a configuration of an individual communication apparatus that is shown in FIG. 3.

Referring to FIG. 3, the communication quality visualization information providing system according to the present exemplary embodiment may further include an individual communication apparatus 600, unlike that of the first exemplary embodiment.

The individual communication apparatus 600 can be connected to a communication network, be carried, and perform a partial function of the communication quality information providing apparatus 100.

The individual communication apparatus 600 may acquire communication quality information of a location at which the individual communication apparatus 600 is positioned and provide the communication quality information to the communication quality information providing apparatus 100, and may connect to a communication network and determine communication quality visualization information from at least one of the position information, image information, and communication quality information providing apparatus 100, the management server 200, the Web server 300, and the map providing server 400.

That is, unspecified persons having the individual communication apparatus 600 may form a social network, acquire communication quality information of a location at which unspecified persons are positioned, and provide the communication quality information to the communication quality information providing apparatus 100, or may determine communication quality visualization information through a Web service such as a social network and a geographic information providing site.

When the communication quality information providing apparatus 100 connects to the individual communication apparatus 600 through the communication module 110 and receives position information, image information, and communication quality information, the controller 150 controls the visualization device 140 to generate communication quality visualization information using the position information, the image information, and the communication quality information that receives from the individual communication apparatus 600 by connecting to the individual communication apparatus 600.

Referring to FIG. 4, the individual communication apparatus 600 includes a communication module 610, a position detection unit 620, and an image photographing unit 630, and a controller 640.

The communication module 610, the position detection unit 620, and the image photographing unit 630, and the controller 640 perform functions of the communication module 110, the position detection unit 120, the image photographing unit 130, and the controller 150, respectively.

Further, the controller 640 may directly disclose communication quality information at Web and share communication quality information with other users.

Figure 5:
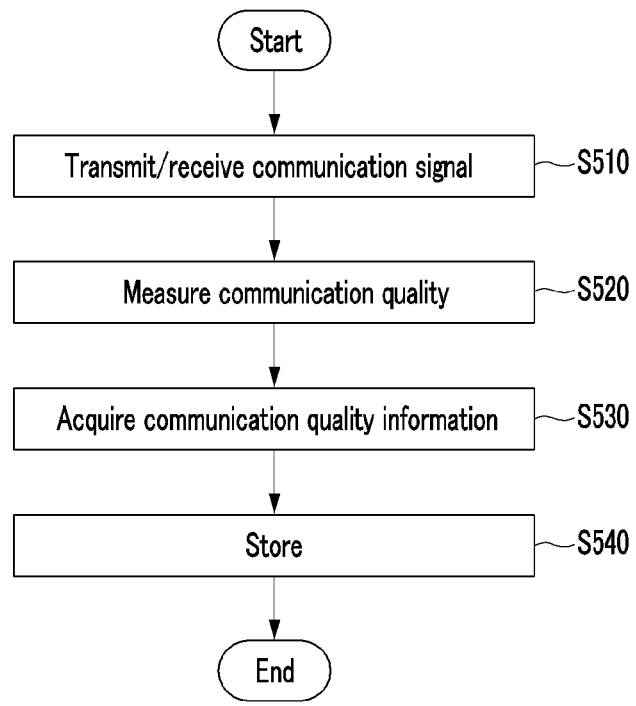
FIG. 5 is a flowchart illustrating a method of measuring communication quality information in a communication module of FIG. 2.

FIG. 5 is a flowchart illustrating a method of measuring communication quality information in a communication module of FIG. 2.

Referring to FIG. 5, the communication module 110 transmits/receives a communication signal with a communication method thereof (S510).

The communication module 110 measures a communication quality from the transmitted/received communication signal (S520) and acquires communication quality information (S530).

Thereafter, the communication module 110 transfers the acquired communication quality information to the visualization device 140 and stores the acquired communication quality information in the communication quality database 160 (S540).

The communication module 610 of FIG. 4 can also acquire communication quality information with such a method.

Figure 6:
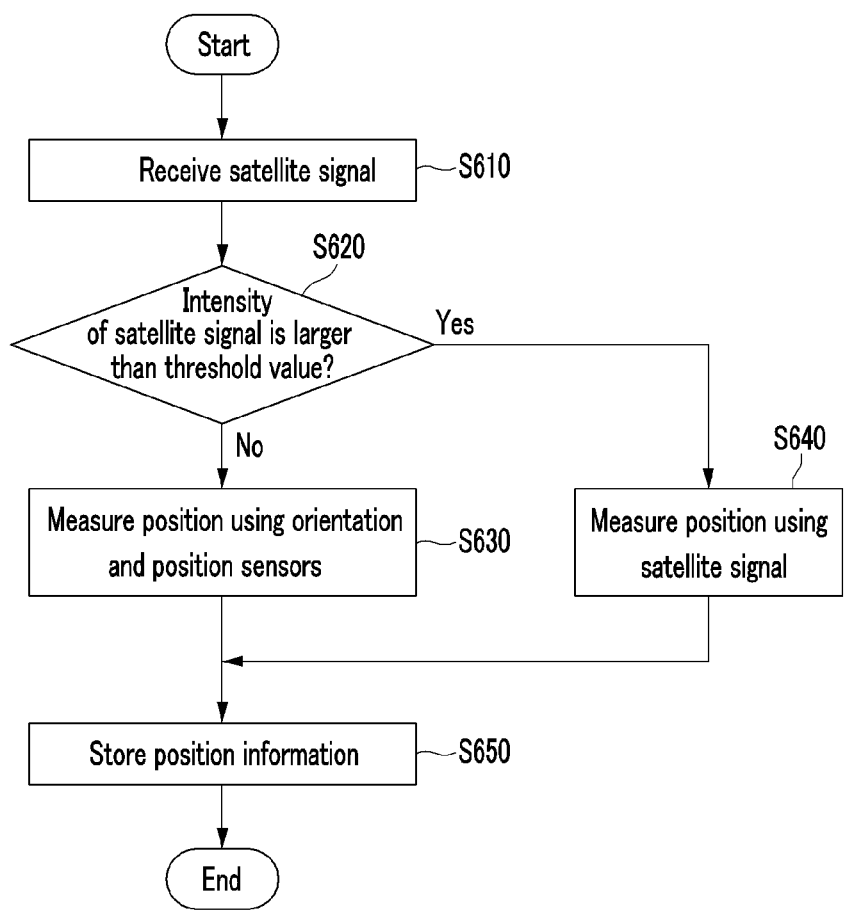
FIG. 6 is a flowchart illustrating a method of acquiring position information in a position detection unit of FIG. 2.

FIG. 6 is a flowchart illustrating a method of acquiring position information in a position detection unit of FIG. 2.

Referring to FIG. 6, the position detection unit 120 receives a satellite signal from an artificial satellite (S610). The position detection unit 120 determines whether intensity of the satellite signal is larger than a threshold value (S620), and if intensity of the satellite signal is equal to or smaller than a threshold value, the position detection unit 120 measures a position of the communication quality information providing apparatus 100 using orientation and position sensors (not shown) (S630), and if intensity of the satellite signal is larger than a threshold value, the position detection unit 120 measures a position of the communication quality information providing apparatus 100 by calculating a longitude and a latitude using a satellite signal (S640).

In this way, the position detection unit 120 acquires position information of the communication quality information providing apparatus 100 from orientation and position sensors or a satellite signal, transfers the position information to the visualization device 140, and stores the position information in the communication quality database 160 (S650).

The position detection unit 620 of FIG. 4 can also acquire position information with such a method.

Figure 7:
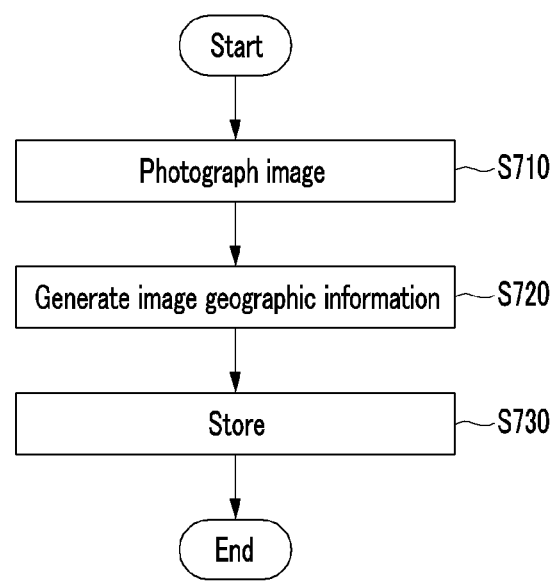
FIG. 7 is a flowchart illustrating a method of collecting image and picture information in an image photographing unit of FIG. 2.

FIG. 7 is a flowchart illustrating a method of collecting image and picture information in an image photographing unit of FIG. 2.

Referring to FIG. 7, the image photographing unit 130 photographs an image while moving (S710).

The image photographing unit 130 generates image geographic information by synthesizing photographed image information with corresponding geographic information (S720). In this case, the image photographing unit 130 preferentially determines update of the corresponding geographic information and updates the corresponding geographic information.

The image photographing unit 130 transfers image geographic information that acquires in this way to the visualization device 140 and stores the image geographic information in the communication quality database 160 (S730).

The image photographing unit 630 of FIG. 4 can also acquire image information with such a method.

Figure 8:
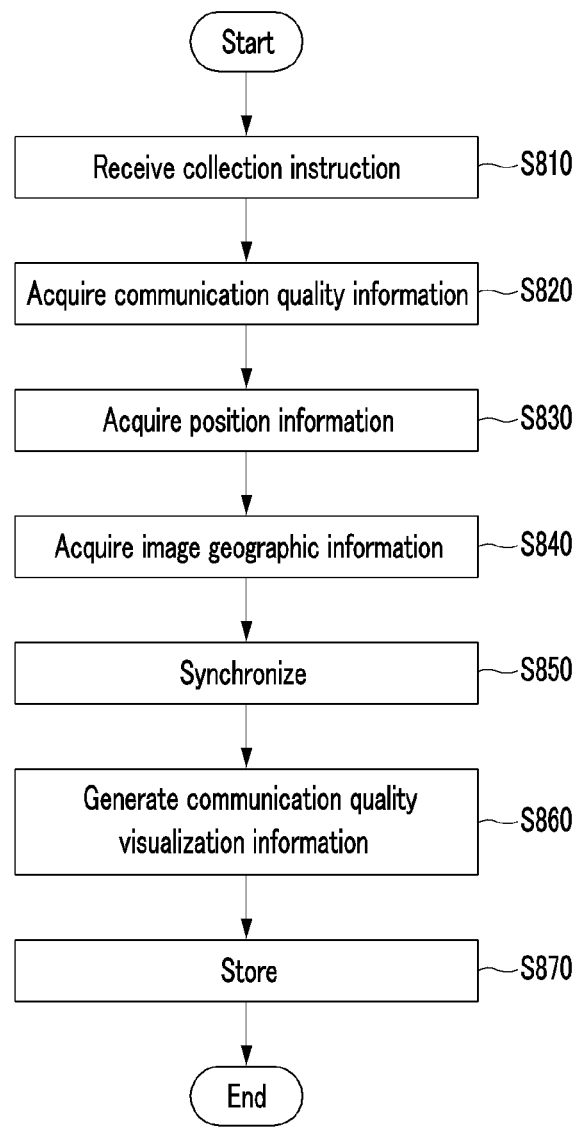
FIG. 8 is a flowchart illustrating a method of collecting communication quality visualization information with a communication quality information providing apparatus of FIG. 1.

FIG. 8 is a flowchart illustrating a method of collecting communication quality visualization information with a communication quality information providing apparatus of FIG. 1.

Referring to FIG. 8, the controller 150 receives a collection instruction of communication quality visualization information from a user through the user interface 170 (S810).

The controller 150 transfers the collection instruction of communication quality visualization information to the communication module 110, the position detection unit 120, the image photographing unit 130, and the visualization device 140.

The communication module 110, the position detection unit 120, the image photographing unit 130, and the visualization device 140 receive the collection instruction of communication quality visualization information from the controller 150, start to collect the communication quality visualization information, and collect the communication quality visualization information until receiving a collection termination instruction of the communication quality visualization information from the controller 150.

The communication module 110 acquires communication quality information by transmitting/receiving a communication signal of a communication method thereof and transfers the communication quality information to the visualization device 140 and the communication quality database 160 (S820).

The position detection unit 120 acquires position information of the communication quality information providing apparatus 100 using a satellite signal or orientation and position sensors (S830) and transfers the position information to the visualization device 140 and the communication quality database 160.

The image photographing unit 130 acquires image geographic information by photographing an image while moving and mapping photographed image information to geographic information (S840) and transfers the image geographic information to the visualization device 140 and the communication quality database 160.

The visualization device 140 synchronizes communication quality information, position information, and image geographic information that receives from the communication module 110, the position detection unit 120, and the image photographing unit 130, respectively (S850) and generates communication quality visualization information by mapping the communication quality information and the position information to the image geographic information (S860).

The visualization device 140 stores the generated communication quality visualization information in the communication quality database 160 (S870). In this case, when the corresponding communication quality visualization information exists in the communication quality database 160, the visualization device 140 updates the communication quality visualization information.

Figure 9:
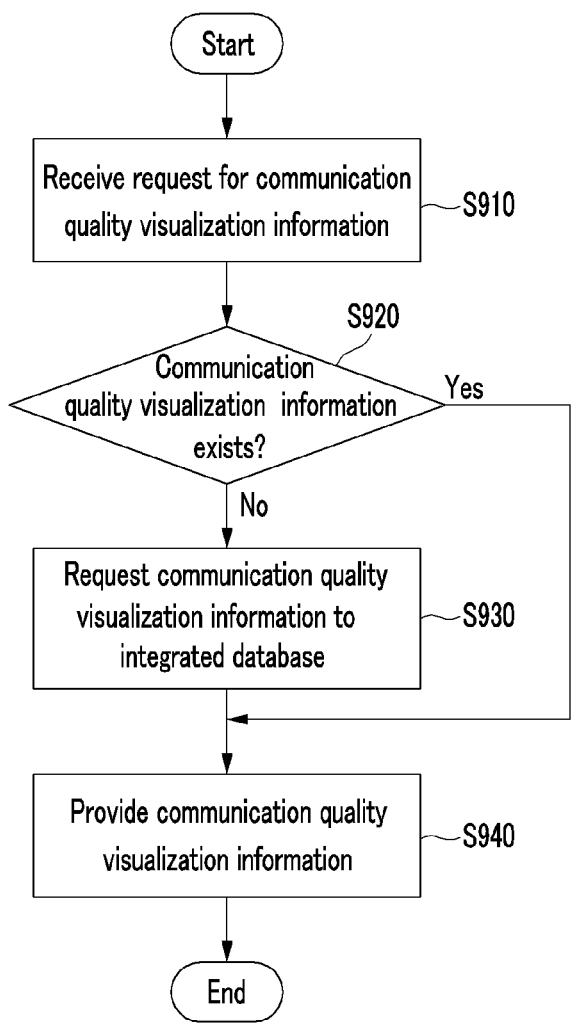
FIG. 9 is a flowchart illustrating a method of providing communication quality visualization information with a communication quality information providing apparatus of FIG. 1.

FIG. 9 is a flowchart illustrating a method of providing communication quality visualization information with a communication quality information providing apparatus of FIG. 1.

Referring to FIG. 9, the controller 150 receives a request for communication quality visualization information from the user through the user interface 170 (S910). The request for communication quality visualization information may include information such as an area and a communication method that are selected by the user.

The controller 150 determines whether communication quality visualization information corresponding to the user request exists in the communication quality database 160 (S920).

If communication quality visualization information corresponding to the user request does not exist in the communication quality database 160, the controller 150 requests corresponding communication quality visualization information to the integrated database 500 through the management server 200 (S930). The controller 150 receives communication quality visualization information corresponding to the user request from the management server 200 and provides the communication quality visualization information to the user (S940). If communication quality visualization information corresponding to the user request exists in the communication quality database 160 at step S920, the controller 150 provides the corresponding communication quality visualization information to the user through the user interface 170 (S940).

When the user requests communication quality visualization information through Web, the controller 150 requests communication quality visualization information to the Web server 300 through the communication module 110 that allows to connect to Web among at least one communication module 110 and provides the communication quality visualization information to the user through Web.

That is, the user can determine communication quality visualization information based on geographic information using the communication quality information providing apparatus 100 and change a communication method to an optimum communication method using the communication quality visualization information, thereby obtaining an improved communication quality.

For example, the user searches for communication quality visualization information of a corresponding area using the communication quality information providing apparatus 100 or the individual communication apparatus 600 before going on a business trip to Gangnam-Gu in Seoul. The communication quality information providing apparatus 100 provides at least one communication method such as WiBro and a wireless LAN existing in a corresponding area and communication quality information of a communication method. In this case, in communication methods, a communication method in which backward compatibility cannot be performed can also be provided.

Accordingly, by determining the communication methods, the user can select a communication method having a good communication quality and perform communication. Because power consumption changes according to a communication quality, the user select a good communication method and perform communication and thus power consumption can be reduced.

By searching for communication quality visualization information of a corresponding area using the communication quality information providing apparatus 100 or the individual communication apparatus 600 while moving, the user can determine an area having a good communication quality and move to a corresponding area.

Further, by searching for communication quality visualization information of a corresponding area using the communication quality information providing apparatus 100 or the individual communication apparatus 600 while moving, the user can determine communication load information.

Further, because a transmission speed changes according to a modulation scheme and a coding scheme, by searching for communication quality visualization information of a corresponding area using the communication quality information providing apparatus 100 or the individual communication apparatus 600, the user can grasp a communication speed and a weak communication area and draw a communication map using communication quality visualization information, and thus a security area and a weak security area may be solved.

A wireless Internet use ratio increases according to increase in a spread ratio of wireless appliances and enlarged supply of an access point (AP). However, as users excessively connect to wireless Internet, a wireless Internet network of existing users may become unstable or a speed thereof may become slow, and a security problem of attempting hacking by connecting to an opening network or of using for a crime by leaking various information may be the chief obstacle to activation of wireless Internet. However, by determining geographic information-based communication quality visualization information through the communication quality information providing apparatus 100 and the individual communication apparatus 600, the user can receive a service in an optimum communication quality state.

An exemplary embodiment of the present invention may be not only embodied through the above-described apparatus and/or method but also embodied through a program that executes a function corresponding to a configuration of the exemplary embodiment of the present invention or through a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication quality information providing apparatus, comprising:
    at least one communication module that receives a collection instruction from a user and that acquires communication quality information corresponding to each communication method while moving;
    a position detection unit that acquires position information of the apparatus according to the collection instruction;
    an image photographing unit that acquires image information by photographing an image according to the collection instruction and that generates image geographic information by mapping the image information to corresponding geographic information; and
    a visualization device that generates communication quality visualization information by synchronizing the communication quality information with at least one of the position information and the image geographic information,
    wherein the communication quality visualization information comprises an image representing the location and one of a picture and a color representing the communication quality information via which user communication devices can connect.

2. The communication quality information providing apparatus of claim 1, further comprising:
    a communication quality database that stores the communication quality visualization information; and
    a controller that receives an information request instruction from the user and that provides communication quality visualization information corresponding to the information request instruction from the communication quality database to the user.

3. The communication quality information providing apparatus of claim 2, wherein the controller stores the communication quality visualization information in a management server through a communication network, and the controller requests the communication quality visualization information to the management server and provides the communication quality visualization information to the user, when the communication quality visualization information corresponding to the information request instruction does not exist in the communication quality database.

4. The communication quality information providing apparatus of claim 1, further comprising a controller that provides the communication quality visualization information to Web to correspond to an information request instruction from the user.

5. The communication quality information providing apparatus of claim 1, further comprising a controller that provides the communication quality visualization information through a map to correspond to an information request instruction from the user.

6. The communication quality information providing apparatus of claim 1, wherein the position detection unit acquires position information of the apparatus from a satellite signal.

7. The communication quality information providing apparatus of claim 6, wherein the position detection unit acquires position information of the apparatus using orientation and position sensors, if intensity of the satellite signal is equal to or smaller than a threshold value.

8. The communication quality information providing apparatus of claim 1, wherein the image information comprises picture information.

9. The communication quality information providing apparatus of claim 1, wherein the image photographing unit determines update of the geographic information and updates the geographic information.

10. A method of providing communication quality information of a communication quality information providing apparatus, the method comprising:
    receiving a collection instruction from a user;
    acquiring communication quality information to correspond to the collection instruction;
    acquiring position information of the communication quality information providing apparatus to correspond to the collection instruction; and
    providing communication quality visualization information by mapping the communication quality information and the position information to geographic information,
    wherein the communication quality visualization information comprises an image representing the location and one of a picture and a color representing the communication quality information via which the user communication devices can connect.

11. The method of claim 10, further comprising acquiring image information to correspond to the collection instruction,
    wherein the providing of communication quality visualization information comprises generating communication quality visualization information by further mapping the image information to the geographic information.

12. The method of claim 11, wherein the providing of communication quality visualization information further comprises synchronizing the communication quality information, the position information, and the image information before mapping.

13. The method of claim 10, wherein the acquiring of communication quality information comprises
    receiving a communication signal of a communication method that can receive; and
    measuring communication quality information from the communication signal.

14. The method of claim 10, wherein the acquiring of position information comprises
    receiving a satellite signal;
    calculating, if intensity of the satellite signal is larger than a threshold value, a position from the satellite signal; and
    calculating, if intensity of the satellite signal is equal to or smaller than a threshold value determined at the position using orientation and position sensors.

15. A method of providing communication quality information of a communication quality information providing apparatus, the method comprising:
    receiving information request comprising at least area information from a user; and
    providing communication quality visualization information corresponding to the information request,
    wherein the communication quality visualization information is generated by mapping the communication quality information to geographic information,
    wherein the communication quality visualization information comprises an image representing the geographic information and one of a picture and a color representing the communication quality information via which the user communication devices can connect.

16. The method of claim 15, wherein the geographic information comprises three-dimensional image geographic information.

17. The method of claim 15, wherein the providing of communication quality visualization information comprises providing the communication quality visualization information through Web.

18. The method of claim 15, wherein the providing of communication quality visualization information comprises providing the communication quality visualization information through a map.

19. The method of claim 15, wherein the providing of communication quality visualization information comprises
   determining whether communication quality visualization information corresponding to the information request exists in a communication quality database in which the apparatus manages; and
   providing, if communication quality visualization information corresponding to the information request does not exist in a communication quality database, the communication quality visualization information by requesting to a management server that comprehensively manages the communication quality visualization information through a communication network.

20. The method of claim 15, further comprising receiving communication quality information and at least one of position information and image information from an individual communication apparatus of the user,
   wherein the providing of communication quality visualization information comprises generating the communication quality visualization information using the communication quality information and the at least one of position information and image information that receives from the individual communication apparatus.

* * * * *